US005236408A

United States Patent [19]
McAdam, III et al.

[11] Patent Number: 5,236,408
[45] Date of Patent: Aug. 17, 1993

[54] METHOD AND APPARATUS FOR FORMING CARTON BLANKS WITH HEMMED EDGES

[75] Inventors: Hugh A. McAdam, III, Hollis, N.H.; M. Paul Burnside, West Townsend; Jeffrey Lindberg, Princeton, both of Mass.

[73] Assignee: International Paper Box Machine Company, Inc., Nashua, N.H.

[21] Appl. No.: 917,574

[22] Filed: Jul. 21, 1992

[51] Int. Cl.⁵ .................... B65H 45/28; B65H 45/30; B65H 47/00; B65H 45/64
[52] U.S. Cl. .................... 493/355; 493/409; 493/60; 493/72; 493/135; 493/144
[58] Field of Search .................... 493/60, 71, 72, 82, 493/134, 135, 142, 144, 341, 342, 355, 357, 287, 409

[56] References Cited
U.S. PATENT DOCUMENTS

3,604,317 9/1971 Baun .................... 493/287
3,654,842 4/1972 Schwenk .................... 493/287
3,847,540 11/1974 Farfaglig .................... 493/134
4,708,708 11/1987 Fries, Jr. .................... 493/134
4,931,031 6/1990 Lisiecki .................... 493/61
4,979,932 12/1990 Burnside .................... 493/72
5,156,585 10/1992 Dimur .................... 493/409

Primary Examiner—Bruce M. Kisliuk
Assistant Examiner—Jack Lavinder
Attorney, Agent, or Firm—Pearson & Pearson

[57] ABSTRACT

A paper box folding and sealing machine for forming a hemmed edge. A skiving station removes a portion of a carton blank material at the area to be hemmed. A hemming station folds the skived portion onto the blank, irons it and then opens the hem to lie in a predetermined plane that intersects the plane of the blank. Superheated air directed in a laminar-like air flow, activates a thermoplastic coating adjacent the skived portion of the area to be hemmed. Folding fingers, tack rollers and presser rollers then fold the skived portion onto the activated thermoplastic coating to form a hem that is sealed against the adjacent portion of the blank.

25 Claims, 9 Drawing Sheets

METHOD AND APPARATUS FOR FORMING CARTON BLANKS WITH HEMMED EDGES

BACKGROUND OF THE INVENTION

1. Field of the Invention

This invention generally relates to the field of paper box folding and sealing and more specifically to an improved apparatus and method for providing a box with a sealed, hemmed edge.

2. Description of Related Art

This invention has particular application to paper box folding and sealing apparatus that moves a succession of carton blanks along a paper line to form, individually, open ended boxes, generally in a folded form. Although carton blanks are formed from a wide variety of materials, this invention is generally related to the manufacture of folded boxes from carton blanks having surface coatings of a thermoplastic material. Such carton blanks generally are laminated with a paper board core and outer coatings of a high or low-density polyethylene or other thermoplastic material. The laminate may contain an optional barrier of metallic foil or other material that forms an essentially gas impermeable membrane.

In some applications a box formed from such a laminated carton blank stores only dry contents or stores materials for very short time intervals. A conventional paper box folding machine for folding such boxes merely overlaps the longitudinal edges of a laminated carton blank, locally heats these overlapped edges and presses them together so the thermoplastic coatings cool and form a sealed longitudinal seam that completes the box in its folded form and in any expanded form. This longitudinal seam should be strong because any failure along this seam can destroy the integrity of the box. It is also important that the seam be formed on paper box folding machines without reducing the operating speed as any such reduction usually increases the box manufacturing costs.

In other applications a box may be designed to store liquids or to store contents in a moist environment. Merely overlapping the edges of the carton to form the box does not produce a longitudinal seam that maintains its integrity over an extended time interval for such applications. Specifically, the conventional overlapped configuration exposes one edge of the paper board core that is at the center of the laminate. If that edge lies inside the carton, the liquid contents can wick through the paper board core and eventually destroy the carton. If that edge lies outside the carton, moisture from the external environment also can wick into the paper board core and can even enter into and contaminate the carton contents. Consequently, under the foregoing conditions it also is important the folded carton prevent such wicking in order to maintain the integrity of the longitudinal seam.

Several sealing solutions have been proposed to provide a strong, reliable longitudinal seam for forming such boxes. According to one proposal, a sealing material is applied to the exposed edge. This process, however, does not readily adapt to conventional paper box folding machines. It is difficult to control and can reduce machine operating speed significantly.

In accordance with another approach, the paper box folding and sealing apparatus forms simultaneously a sealed hem and the longitudinal seam. U.S. Pat. No. 3,495,507 (1970) to Haas et al, for example, discloses apparatus that skives a strip of carton material adjacent to the edge of a sealing panel, scores the center of the skived strip and then folds the skived strip on itself to form a hem. The hem then is heated and pressure bonded to an overlapped portion of the carton blank to form the sealed hem and longitudinal seam simultaneously. In this hem the skived faces are in intimate, but unsealed, contact.

U.S. Pat. No. 3,654,842 (1972) to Schwank discloses a similar structure that overcomes an apparent problem in Haas. Specifically as the folded, but unsealed, hem moves along a paper line as shown in Haas et al, the hem can open. Schwank minimizes this effect by cutting or forming a score line down the center of the skived portion.

U.S. Pat. No. 3,754,456 (1973) to Andrews et al discloses other apparatus for folding a foil about the edge of a paper board blank to provide a seal. In these embodiments, however, the carton leaves an exposed edge at the longitudinal seam on the exterior of the carton that is subject to wicking.

Apparatus according to these disclosures also can limit maximum machine operating speed. Andrews et al, for example, discuss maximum operating speeds in the range of 400 feet per minute. Apparently there is an inability to control the folding process accurately at elevated speeds. The systems such as disclosed in Haas et al and Schwank operate at higher speeds but generally less than 1000 feet per minute. In many cases this limit controls the maximum machine operating speed.

It also has been suggested to separate the manufacturing steps for forming a sealed hem and for forming the longitudinal seam. For example, U.S. Pat. No. 3,604,317 (1971) to Braun discloses apparatus that makes a partial cut through the blank parallel to an edge to be hemmed. Skiving then removes a significant portion of the material between the outer edge and the cut including the thermoplastic material and a portion of the core facing the skiving apparatus. After the skived area and the adjacent area pass over an open burner, folding fingers wrap the skived portion around the end at the cut to lie against a lower coated carton surface adjacent the skived portion and form a hem. Pressing the skived portion against the coating adjacent the cut produces a bond with the skived portion to complete the hem. Braun recognizes that aerodynamic forces acting on the blanks become important considerations at higher operating speeds, specifically relative to the skiving operation. However, as the aerodynamic effects become more prevalent, it also becomes more difficult to accurately engage the flap after it leaves the burner. Consequently, elevating speed increases the difficulty encountered in folding the skived portion through 180° onto the adjacent portion of the carton in an accurate and repeatable fashion.

Further, if the heating section of the apparatus is not carefully controlled, the heat can raise the coating temperature on portions of the carton adjacent the hem that are not involved in sealing the hem. At such temperatures, polyethylene can accumulate on subsequent apparatus thereby changing the operation parameters of that apparatus and require unnecessary cleaning that interrupts manufacture. Moreover, if these coatings are located at the longitudinal seam, the subsequent longitudinal seal may be weakened. These considerations still impose an operating speed limit of about 800 to 1000 feet per minute.

U.S. Pat. No. 4,540,391 (1985) to Fries, Jr. discloses another method and apparatus for skiving and hemming paper board boxes. Two successive skiving operations produce an approximately flat outer skived surface parallel to the surfaces of the carton and a sloped inner skived surface. After the skiving operation is complete, the outer skived portion folds over the sloped skived portion and adjacent portions of the carton and apparatus irons the outer skived portion in place. This allows the outer skived portion to spring into an upright position at about 90° to the plane of the carton after the ironing section is complete due to internal restoring forces within the carton. A heater raises the temperature of both the skived portions and the thermoplastic coating adjacent the skived portion to a level below which the exposed paper board in the skived portion scorches. After the blank leaves the heating station, the upright skived flap is folded onto the carton blank before it passes through a clamping or sealing structure that compresses the overlapped skived portion against the carton blank while the thermosetting material cools.

The resulting hem has an unsealed interface between the sloped skived portion and the abutting flat skived portion. These surfaces can move relative to each other and constitute a potential source of hem and longitudinal seam weakness. The dependence on internal restoring forces to retain the skived portion to a generally upright position can produce a significant range of angles particularly as speeds increase. At Fries' permissible upper temperature limit it is possible for sufficient heat to transfer through the skived portion to activate the thermosetting plastic on the remote side of the carton thereby potentially reducing the effectiveness of the longitudinal seam. As previously discussed, the thermoplastic material can accumulate on the following folding apparatus at these temperatures. These and other parameters of the Fries system apparently limit the operating speed of the folding and sealing apparatus to about 600 to 1000 feet per minute.

SUMMARY

Therefore it is an object of this invention to provide a method and apparatus for forming a hemmed edge on a paper carton blank that is adapted for improved process control. Another object of this invention is to provide an improved apparatus and methods for forming a hemmed edge on a paper box carton that enables the paper box folding apparatus to operate at increased speeds.

Still another object of this invention is to provide an improved method and apparatus for forming a hemmed edge on a paper box carton that improves the reliability of a longitudinal seam.

In accordance with one of aspect of this invention, the edge of a paper box carton is hemmed by initially skiving the blank at a predetermined area such as a first half of an edge portion. Then the first half is moved to a stable position in a plane that intersects the plane of the paper carton blank and exposes the second half of the edge portion for being activated. Thereafter the skived portion is sealed onto the remaining edge portion to form a hemmed edge that subsequently forms a longitudinal seam along a finished carton.

In accordance with another aspect of this invention, a paper box folding machine includes an improved hem forming apparatus with skiving apparatus for skiving the blank in a first half of an edge portion to be hemmed. A folding apparatus stably positions the first half of the edge portion in a plane that intersects the plane of the blank and exposes the second half of the edge portion. Heating apparatus activates a thermoplastic coating exclusively at the second half of the edge portion adjacent the skived portion. Sealing apparatus then places the skived portion onto the second edge portion half and produces a seal. In accordance with this invention the apparatus produces the hemmed edge without activating any exposed thermoplastic coatings.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1A:
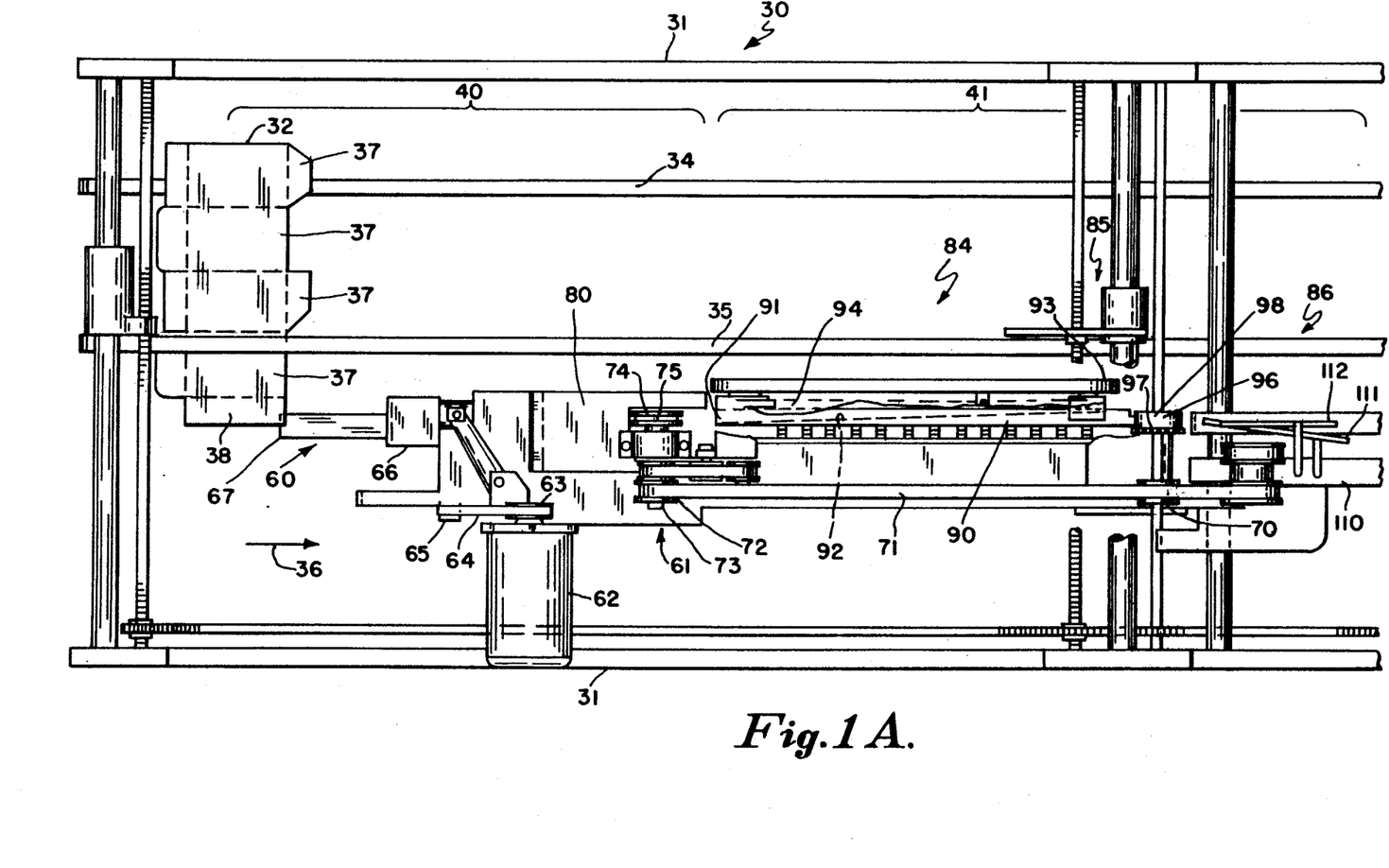
FIGS. 1A and 1B disclose, in a top view, the various components of a paper box folding machine incorporating this invention.
Figure 1B:
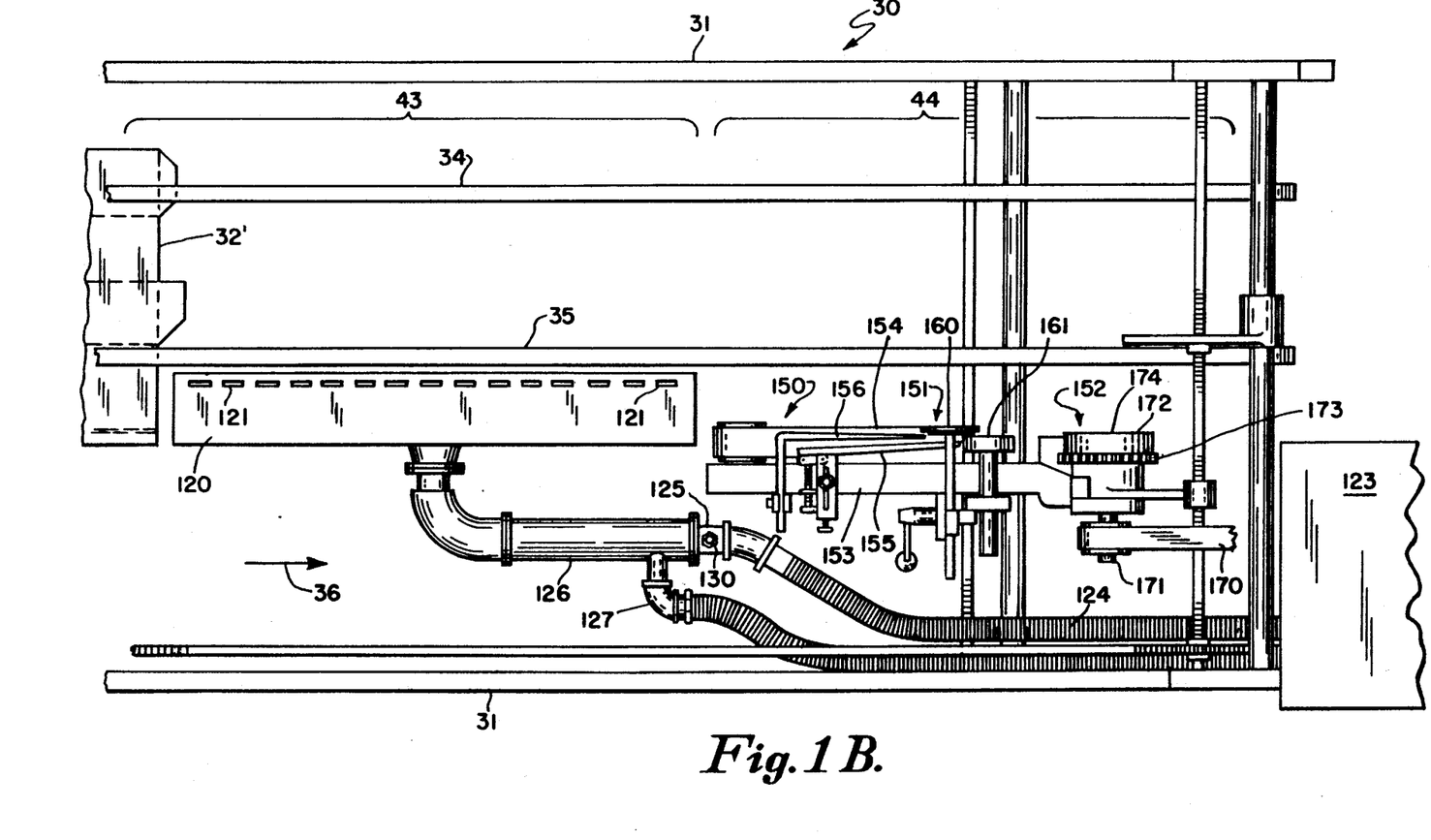
Figure 2A:
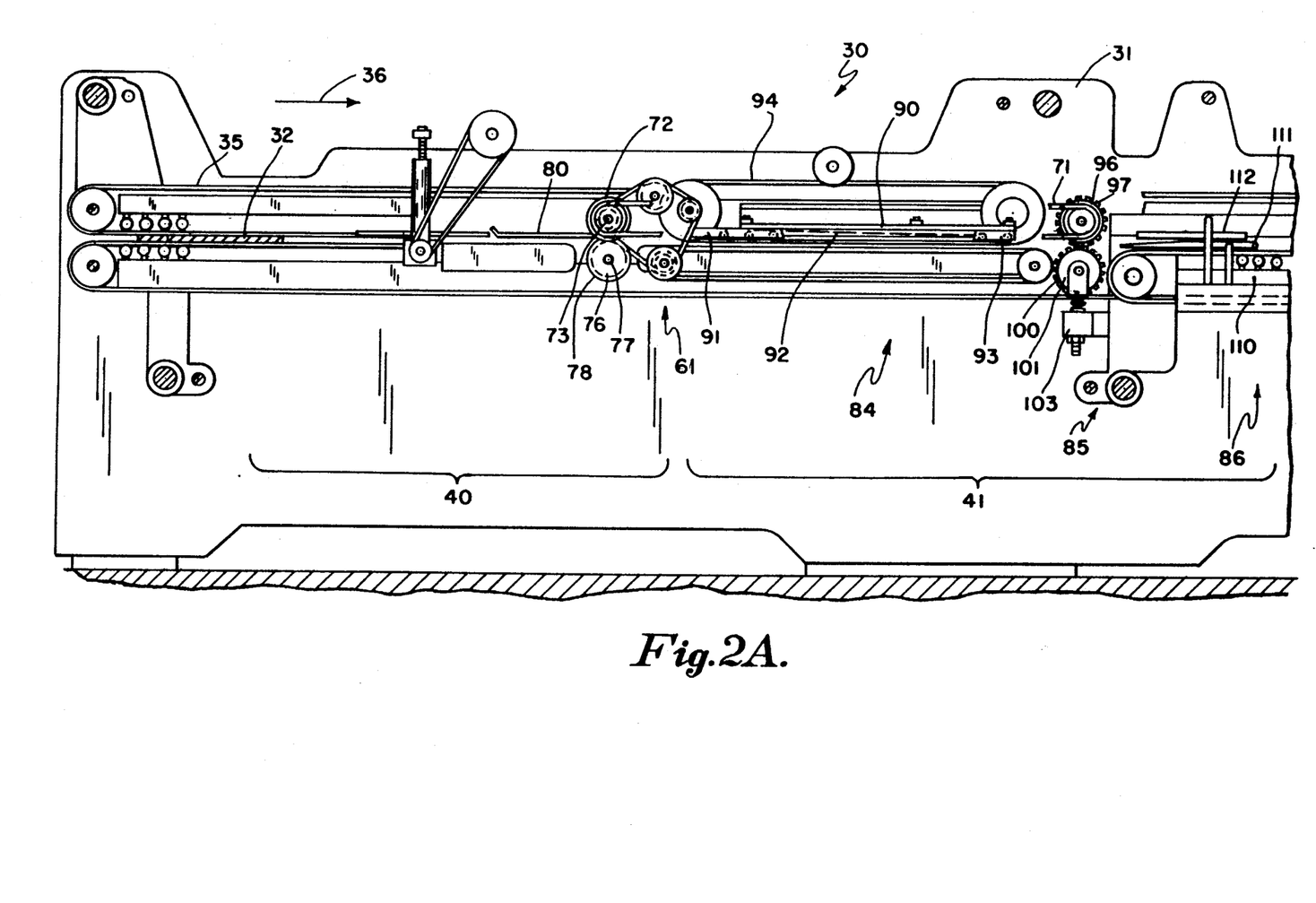
FIGS. 2A and 2B are side views of the equipment disclosed in FIGS. 1A and 1B, respectively.
Figure 2B:
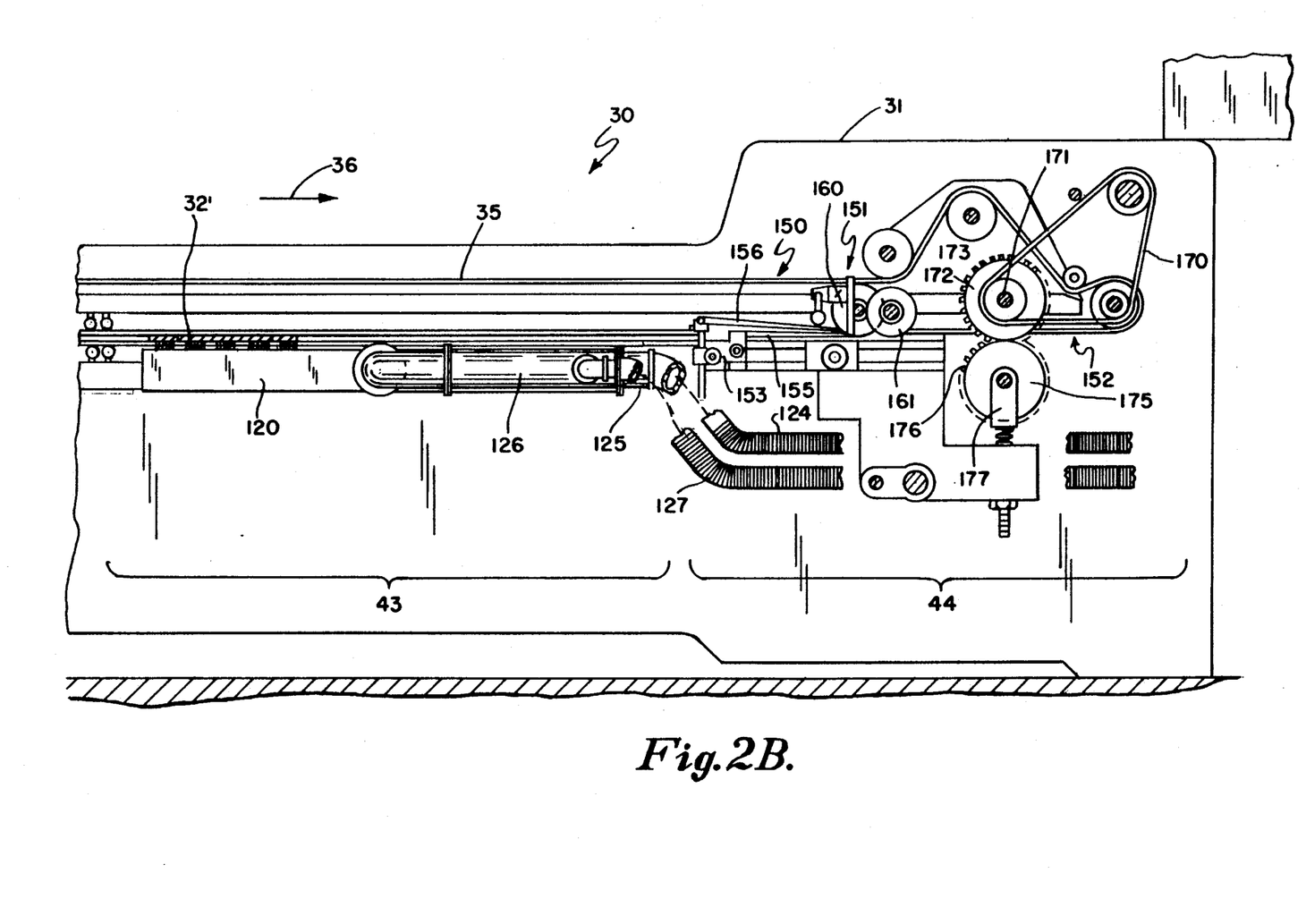

Taken together FIGS. 1A and 1B constitute a top view of a paper box folding apparatus 30 constructed in accordance with this invention; FIGS. 2A and 2B are a side view of that apparatus. For purposes of general reference the apparatus 30 shown in FIGS. 1A, 1B, 2A and 2B includes a main frame 31. Various elements are shown in these figures, but not described in detail. These elements are well known in the art and are not necessary to an understanding of this invention, so they are not described in any detail.

The apparatus 30 transfers a carton blank such as a carton blank 32 shown in FIGS. 1A and 2A along the apparatus 30, from left to right as shown in the figures. FIGS. 1B and 2B depict another carton blank 32' at another position in the apparatus 30. The apparatus 30 includes main conveyor belt sets 34 and 35 that transport the cartons 32 and 33, generally in a horizontal plane, from left to right in the figures along a paper line axis through the apparatus parallel to the conveyor to the conveyor belts 34 and 35 and referred to herein as a paper line axis by paper line arrow 36 is parallel to this axis and points in the direction of blank travel.

FIG. 1A depicts a representative carton 32 as comprising a series of side-by-side elongated panels 37 arranged transversely to the paper line 36. An edge portion 38 extends from one side of the panels 37 and parallels the paper line 36. Initially the edge portion 38 is coplanar with the panels 37. The apparatus shown in FIGS. 1A, 1B, 2A and 2B hems this end portion 38 to seal the paper board core.

The apparatus shown in FIGS. 1A through 2B is divided into four basic zones. A skiving zone 40 in FIGS. 1A and 2A skives between 5% and 50% of the material from an outer half of the edge portion 38. That is, the skiving removes material from a strip that parallels the conveyor belts 34 and 35 and that extends back from the edge (the bottom edge in FIG. 1A) for about half the distance of the edge portion 38.

In a prefolding zone 41 (also shown in FIGS. 1A and 2A), a series of folding and ironing operations position the skived portion at a predetermined position with respect to the blank. More specifically, when a blank leaves the prefolding zone 41, the skived portion has been positively positioned at substantially 90° with respect to the plane of the panels 37.

Apparatus in a heating zone 43 shown in FIGS. 1B and 2B, precisely directs heat toward the inner half of the edge portion 38 thereby to raise the temperature of the coating on the surface adjacent the skived portion to an activation level. The activation temperature is the temperature above which the thermoplastic material will bond to another material. However, precise control of this heating step prevents the temperature of coating on the opposite sides on the other half of the material from rising to the activation level.

In a sealing zone 44 shown in FIGS. 1B and 2B, other apparatus folds and clamps the skived portion to the inner half of the edge portion. As the blank passes through the sealing zone 44 it also cools. The skived portion thereupon seals to the adjacent inner half of the edge portion and the skived portion thereby wraps around the exposed paper board core and seals this edge.

Figure 3:
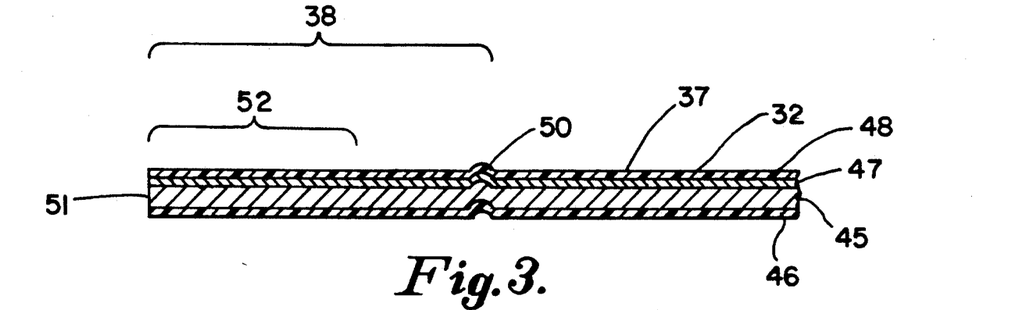
FIG. 3 is an enlarged cross-section of a portion of a carton blank that can be used in the apparatus of FIGS. 1A through 2B.

FIG. 3 depicts an enlarged cross-section of a portion of a carton blank 32 that is adapted for manipulation in the apparatus of this invention. As shown in FIG. 3, the blank 32 includes a paper board core 45. A thermoplastic coating 46 covers the bottom surface of the paper board core 45 as shown in FIG. 3. In this particular embodiment, the carton blank 32 additionally includes a barrier 47 on the top surface of the paper board core 45. The barrier 47 may be constituted by a sheet of foil or a laminated structure including a foil or other sheet. A second thermoplastic coating 48 covers the top surface of the barrier 47 as shown in FIG. 3. If the foil were not included, the thermoplastic coating 48 would cover the top surface of the paper board core 45.

Typically the blanks are prescored to define the various panels 37 shown in FIG. 1A, for example. As shown in FIG. 3 a score line 50 defines, with the edge 51, the edge panel 38, an edge portion 52 to be hemmed in accordance with this invention.

Two operations occur in the skiving zone of FIGS. 1A and 2A. As more specifically shown in FIGS. 4 and 8, a skiving station 60 removes a portion of the blank between the edge 51 and a parallel line about the midpoint of the edge portion 52. A scoring station 61, shown in FIGS. 4 and 9, forms a score line in the material at the juncture of the skived portion and the balance of the carton, again about half way across the edge portion 52.

Figures 4, 5:
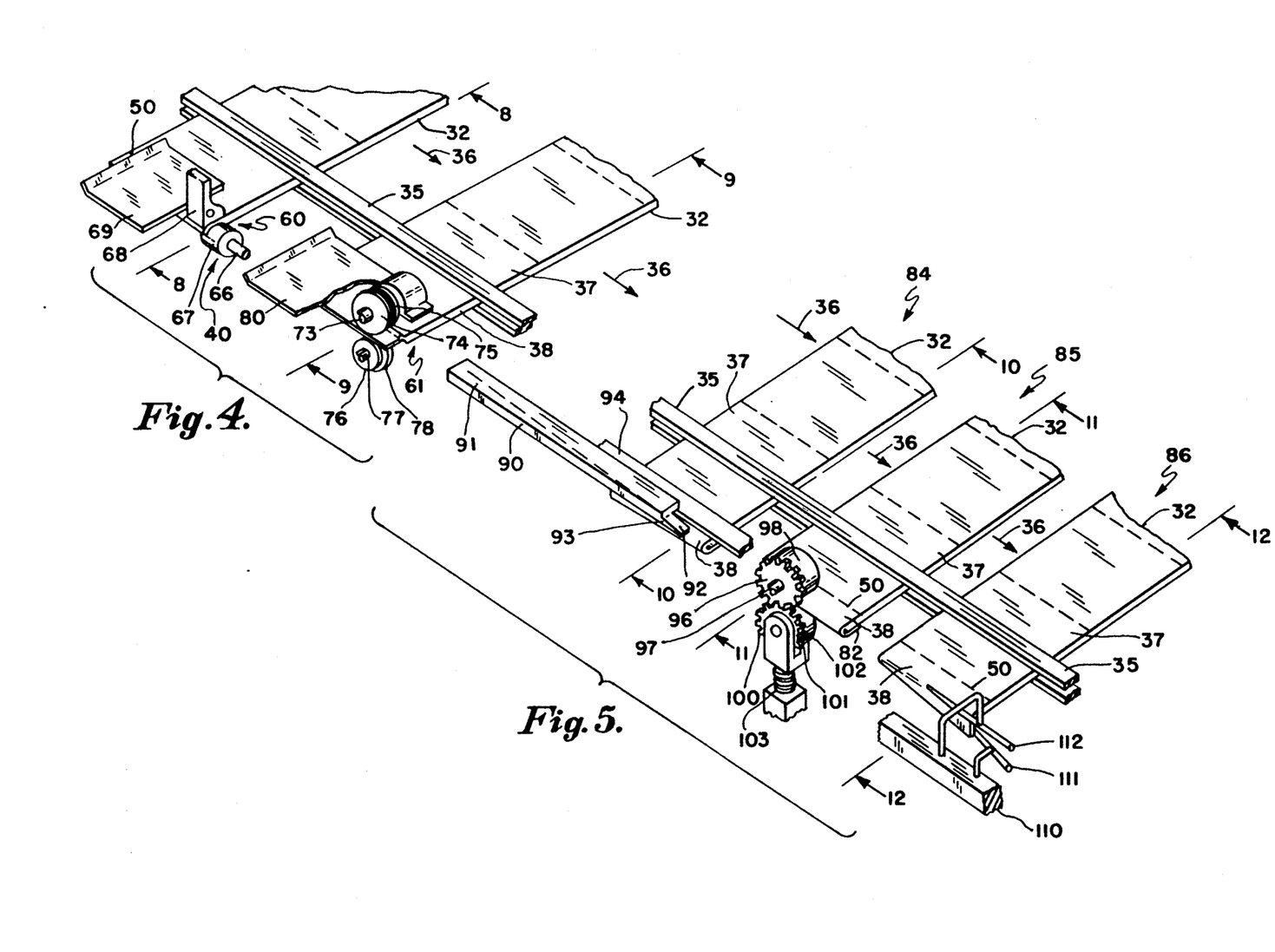
FIGS. 4 through 7 are a series of perspective views that assist in an understanding of this invention.
Figure 8:
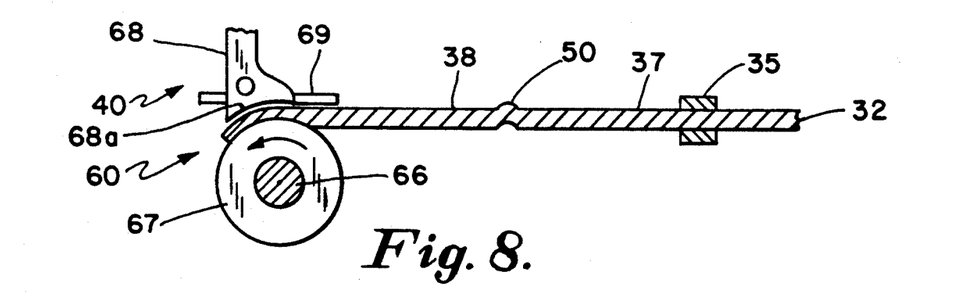
FIGS. 8 through 16 are a series of partial cross-sections corresponding generally to the perspective views of FIGS. 4 through 7 respectively, and are taken along corresponding cross-section lines shown in FIGS. 4 through 7.

Referring first to FIGS. 1A and 2A, a drive motor 62 at the skiving station 60 drives a bell skiving apparatus from a pulley 63 on the motor 62, a drive belt 64 and an input shaft 65 to a right-angle drive 66 that rotates a bell skiving knife 67. Referring primarily to FIGS. 4 and 8 a presser foot 68 spaced above the bell skiving knife 67 controls the amount of material that is skived from the outer half of the edge portion 52 shown in FIG. 3. A cylindrical surface 68a on the presser foot 68 assures that the skiving operation produces a skived portion of essentially constant thickness. A guide plate 69 upstream from the bell skiving knife 67 and the presser foot 68 aligns the blank 32 for transfer through the skiving section 60.

The creasing or scoring section 61 shown in FIGS. 1A, 2A, 4 and 9 includes a drive pulley 70 that is tied to the main conveyor drive (not shown). A belt 71 transfers motion from the pulley 70 to an input pulley 72 that drives a shaft 73. The shaft 73 carries a female creasing wheel 74 with a circumferential groove 75 formed in the surface thereof. A second wheel 76 mounted on an idler shaft 77 includes a bead 78 about the circumference. A guide plate 80 maintains carton alignment for the creasing wheels 74 and 76. The gap between the wheels 74 and 76 can be adjusted to compensate for blanks of different thicknesses. The creasing wheels from a score line 81 at the juncture of a skived portion 82 with a full thickness portion 83 of the edge portion 52.

Figure 9:
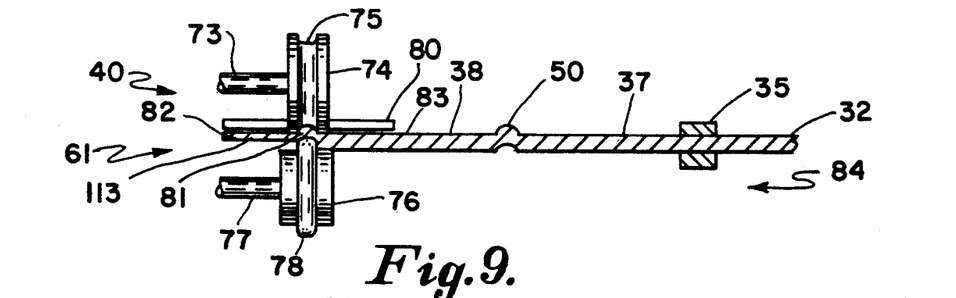

As shown particularly in FIG. 9, when the blank 32 leaves the skiving zone 40, the edge portion 52 shown in FIG. 3 comprises the skived predetermined area such as the first half 82 between the edge 51 and the score line 80. As will become apparent later, the remaining, or second half 83 of the edge portion 52 is maintained at a full thickness and contains both the bottom and top thermoplastic coatings 46 and 48. The skived portion 82 comprises the top coating 48 and a remaining portion of the paper board core 45. The overall thickness of the skived portion 82 can be selected between about 5% and 50% of the full thickness of the blank 32.

Figure 10:
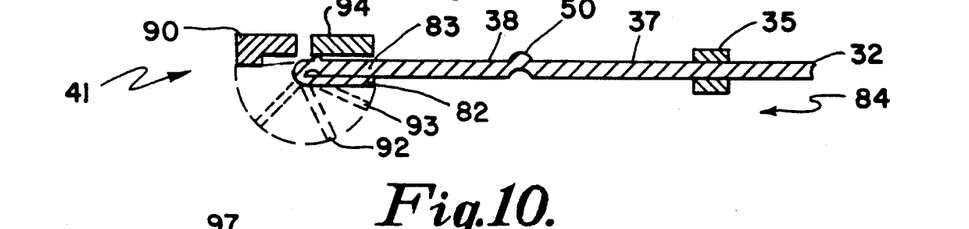

After skiving, the blank 32 enters the prefolding zone 41. The prefolding zone 41 positions the skived portion 82 is in a stable plane that intersects the plane of the blank 32 when it leaves the prefolding zone 41 as shown in FIG. 9. More specifically, the prefolding zone 41 comprises a hem folding station 83, a hem ironing station 84 and a hem positioning station 85. Referring to FIGS 1A, 2A, 5 and 10, the hem folding station 83 comprises a bracket 90 that, at its upstream end 91, engages the upper surface of the skived portion 82 as it leaves the creasing station 61. An edge 92 on the bracket rotates about an axis to define an elongated helix between the upstream end and a downstream end 93. As the blank 32 travels past the bracket 90, the edge 92 rolls the skived portion 82 counterclockwise as shown in FIG. 10 until the skived portion 82 abuts the thermoplastic coating 46 on the second half 83 of the edge portion 52.

Figure 11:
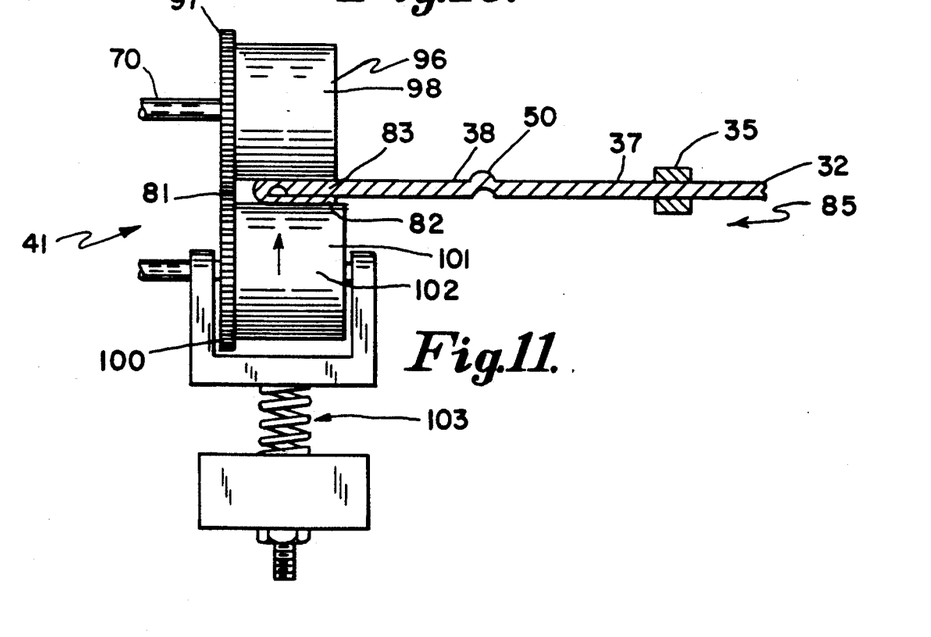
Figure 12:
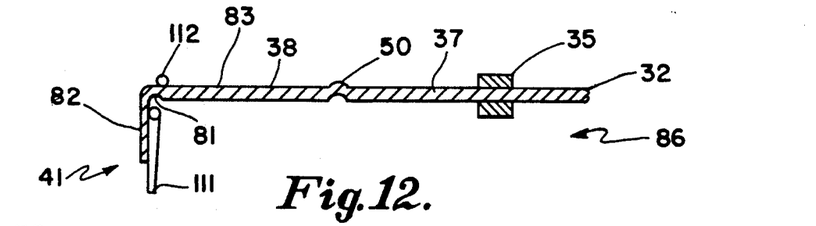

The hem ironing station, shown most clearly in FIGS. 5 and 11, includes an upper presser roller 96 having a geared flange 97 and a smooth cylindrical hub 98. An extension of the shaft 70 drives the upper presser roller 96. A geared flange 100 on a lower presser roller 101 drives the lower presser roller 101 on an idler shaft. A cylindrical hub 102 is spaced from the cylindrical hub 98. A spring mounting mechanism 103 supports the lower presser roller 101 and provides a means for adjusting the gap between the cylindrical hubs 98 and 101. As the hem formed by the overlapped first half 81 and second half 83 of the edge portion 52 pass through the presser roller station 85, the presser rollers 96 and 101 iron the hem with sufficient force to alter the carton structure whereby any tendency of material to spring open is eliminated.

Figure 13:
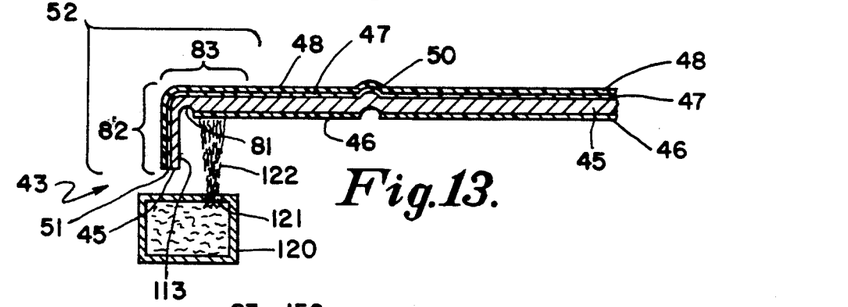

Referring to FIGS. 1A, 2A, 5 and 12, the hem positioning station 86 moves the skived portion 82 to a predetermined position. Particularly the skived portion 82 lies in a plane that intersects the plane of the carton 32 at substantially right angles. The hem positioning station 86 includes a bracket for mounting a lower hem opening finger 111 and an upper hem opening finger 112. The lower hem opening finger 111 is positioned to intercept the hem and to ride at the interface of the skived portion 82 and the adjacent portion 83 thereby to open the hem. The upper opening finger 112 is positioned to engage the upper coating 48 of the blank 32 at a position approximately corresponding to the score line 81. When the blank 32 leaves the prefolding zone 41 and enters the heating zone 43, it has a form as shown in FIG. 13.

In one specific example the skived portion 82 lies in a vertical plane (i.e., at right angles to the panels 37). The apparatus in the prefolding zone 41 precisely positions the skived portion 81 at a substantially constant angular position as each blank enters the heating station 41, even at high operating speeds up to 1000 to 1500 feet per minute or more.

Referring now to FIGS. 1A, 1B, 6 and 13, the apparatus forming the heating zone 43 includes an elongated plenum 120 disposed below the plane of the blanks 32 and parallel to the paper line 36. A plurality of aligned slotted openings 121 are elongated along an axis parallel to the paper line 36. When superheated air is supplied to the plenum 120, the plenum 120 produces a laminar-like air flow 122 from each of the slot openings 121. This air flow impinges the lower thermoplastic coating 46 in an area substantially coextensive with only the second half portion 83 of the edge portion 52 as a blank moves along the paper line 36.

More specifically, a control system 123 (FIG. 1B) provides a controlled air-fuel mixture through a conduit 124 to a combustion chamber 125. The heated air from the chamber 125 enters a manifold 126 for combination with air provided from the control system 123 through an air conduit 127. The manifold 126 directs the resulting superheated air into the plenum 121 with a sufficient velocity and pressure to produce the laminar flows 122 from the openings 121.

The control system 123 contains sufficient control mechanisms, all of which are well known in the art, for adjusting the air fuel mixture and the air flows to obtain appropriate operating conditions for any specific carton configuration. As shown in the figures, a spark plug 130 ignites the fuel-air mixture. After combustion begins, however, it is self sustaining. Typically another sensing device will be included to stop the air fuel mixture flow if combustion ceases.

Referring specifically to FIG. 13, the resulting laminar-like super heated air flow heats and activates the thermoplastic layer 46 substantially in the area of the second half 83 of the edge portion 52 as the carton 32 passes over the plenum 120. Heating adjacent surfaces, particularly the thermoplastic layer 48 in the edge portion 52 does not activate the thermoplastic coating 48. Consequently when the edge portion 52 is subsequently formed into the longitudinal seam, no deleterious effects have been introduced by premature activation and cooling of the thermoplastic coating 48.

It has also been found that the burning of the air fuel mixture in this structure produces a very low level of combustion products. Consequently exhausting the super-heated air directly into the atmosphere introduces significantly fewer combustion products than is introduced by open flame burners of the prior art.

Figures 6, 7:
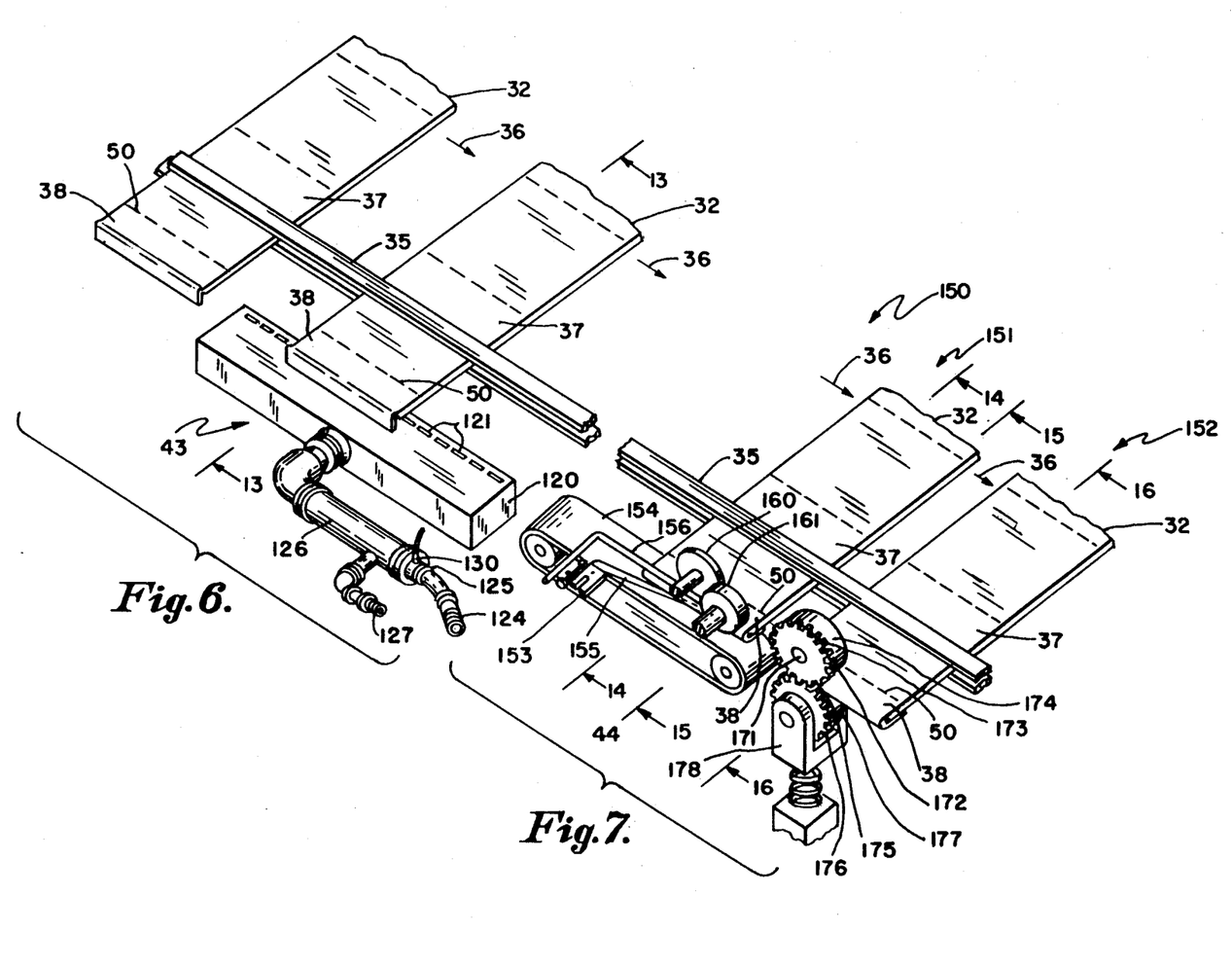
Figures 14, 15:
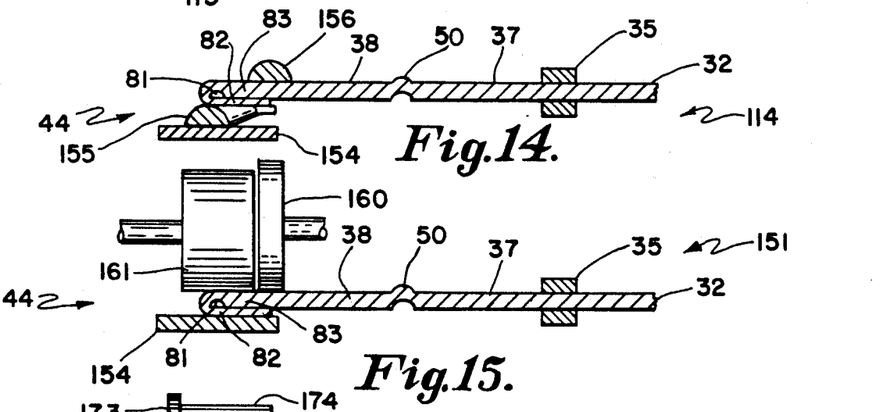
Figure 16:
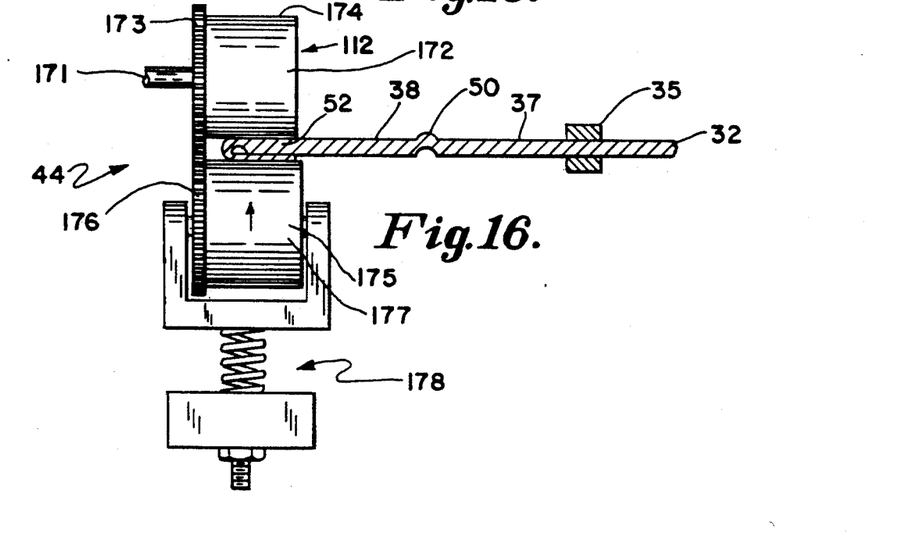

After the blank 32 leaves the heating zone 43, it enters the sealing zone 44 including a folding station 150, a tack rolling station 151 and a sealing and cooling station 152 as shown in FIGS. 1B and 2B. Referring specifically to FIGS. 7 and 14, the folding station 150 comprises a bracket 153 for supporting, in a spaced relationship to a conveyor belt 154, a lower folding finger 155 and an upper folding finger 156. The lower folding finger 155 is oriented to engage the thermoplastic coating 48 on the skived portion 82 and the finger 156 is positioned to engage the thermoplastic coating 48 in the second half portion 83. The relative orientation of the fingers 155 and 156 parallel to the paper line produces a folding action that initially lifts the blank 32 and folds the skived portion 82 under the blank 32 to engage the bottom thermoplastic coating 46 in the area of the second half 83. As the fingers are tapered such that the carton 32 leaves the folding station 150 on the conveyor belt 154 for delivery to the tacking station 151.

As will be recalled, the prefolding station 41 precisely positions the skived portion 82 and altered the physical structure of the blank. This action conditions the blank so that there is substantially no deflection of the skived portion due to aerodynamic influences or heating. Thus, it is possible to locate the fingers 155 and 156 precisely thereby to control this folding operation accurately.

The tacking station 151 includes a tacking wheel 160 and a pressure roller 161 that act in tandem on the edge portion 59 as the blank 32 advances. Both the tacking roller 160 and pressure roller 161 rotate on idler shafts and can be adjusted transversely and vertically to accommodate differently configured cartons.

In the sealing station 152, the edge portion 52 of the carton passes between presser rollers where the thermoplastic coating 48 cools and seals the skived portion 82 against the second half 83. As shown more specifically in FIGS. 1B and 2B, a take off belt 170 coupled to the main drive engages a shaft 171 that rotates an upper presser roller 172. Like the presser roller shown in FIGS. 5 and 11, the upper presser roller 172 includes a geared flange 173 and a cylindrical hub 174. The presser roller 172 drives a lower presser roller 175 by engagement of the geared flange 173 with a geared flange 176 on the lower presser roller 175. The lower pressure roller 175 also includes a cylindrical hub 177. A spring mounting 178 produces the ironing force and provides some adjustment of the gap that exists between the presser rollers 172 and 175.

As the edge portion 52 passes through the presser rollers and 175, the presser rollers 172 and 175 simultaneously iron the skived portion 82 against the second half portion 83 and assist in cooling the thermoplastic material thereby to bond the skived portion 82. This operation compresses the edge portion 52 so the increased thickness of the sealed hem 52 over the thickness of the remaining portions of the carton blank is minimal.

Figure 17:
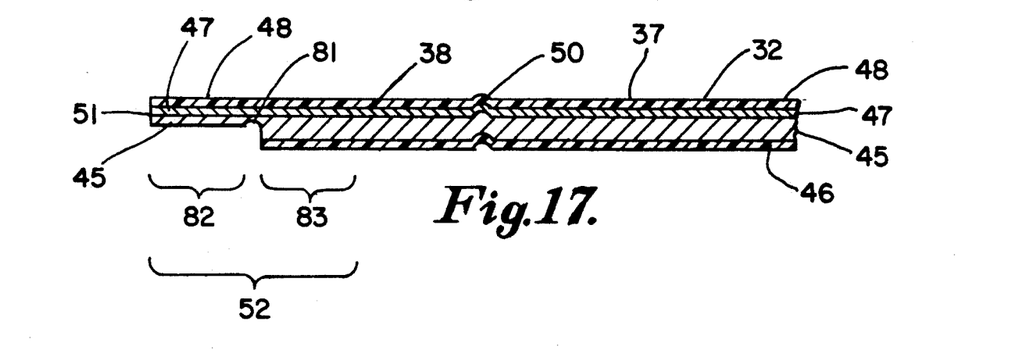
FIGS. 17 through 19 are enlarged cross-sections of portions of a carton blank as it leaves the apparatus shown in FIGS. 8, 12 and 16 respectively.
Figure 18:
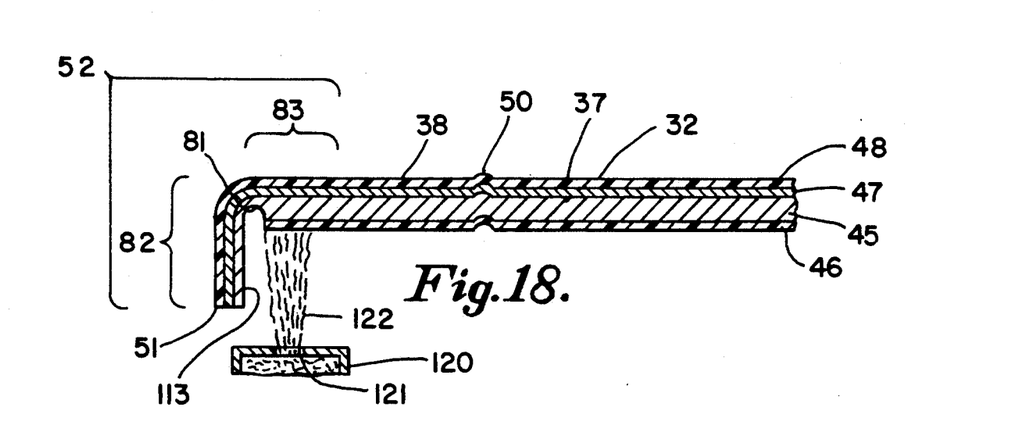
Figure 19:
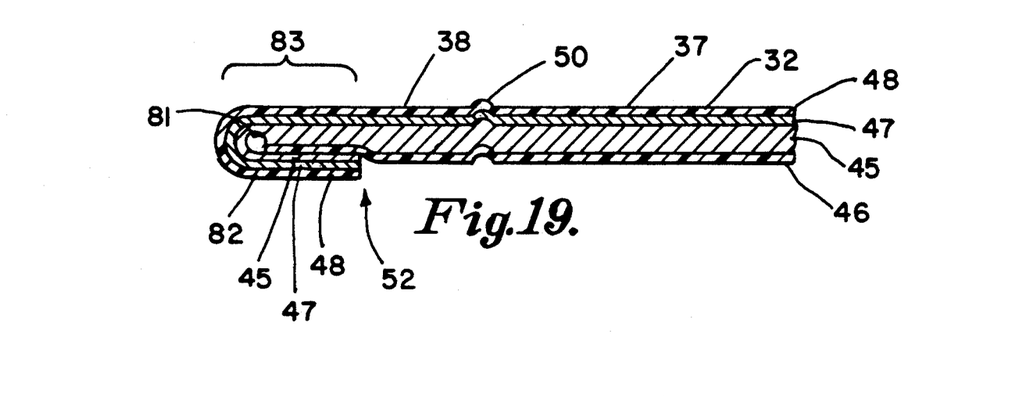

In summary, the apparatus shown in FIGS. 1A through 2B and 4 through 16 modifies a carton blank 32 shown in FIG. 3 to produce a hem 52 in an edge panel 38 that can subsequently be sealed in a longitudinal seam to another portion of the carton for completing the construction of a box. The disclosed apparatus first forms a skived portion 82 as shown in FIG. 17 that removes the corresponding portions of the thermoplastic coating 46 and the paper board core 45. It also produces a crease or score line 81 extending parallel to the board to facilitate the subsequent hemming operation. After the hemming operation, as shown in FIG. 18, the skived portion 82 is positioned in a plane at substantially right angles to the plane of the edge portions 38 and the remainder of the blank 32. This faces the skived surface 113 of the skived portion 82 toward the right shown in FIG. 18. Superheated air in laminar-like flows 122 from a plenum 120 activates that portion of the thermoplastic coating 46 that corresponds substantially to the area of the second half of the hem 83. Consequently none of the thermoplastic coating 48 is elevated to an activation level so no chemical or other changes can occur. When the blank 32 leaves the apparatus, it has a hemmed seal 52 as shown in FIG. 19. There is no exposed paper board edge 51. The compression of the paper board core 45 in the vicinity of the seal buries the exposed portion and covers it with the thermoplastic coating 46. Again, the outer thermoplastic layer 48 has not been activated, so subsequent heating and ironing with another portion of the carton produces a strong integral longitudinal seam.

In accordance with several objects of this invention, therefore, the disclosed apparatus and method provide a longitudinal seam that remains strong to maintain carton integrity. Separating the various operations into a series of discrete operations improves process control so that operating speeds can be increased. Further, the control of the heating operation and the failure to activate the thermoplastic coating 48 prevents any buildup of thermoplastic material on any of the components, particularly the folding fingers 155 and 156 in the folding station 150. Consequently fewer interruptions in the system operation are required for cleaning. This also increases average operating speeds. Finally, as will be apparent all the apparatus forming the hem at the end panel 38 can be readily adapted to conventional paper folding and sealing machines and a given machine can process blanks of different sizes and shapes.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a paper box folding machine for forming individually and successively planar carton blanks into folded cartons, said machine including conveyor means for transporting successive, spaced blanks along a paper line axis and means for forming a coplanar edge portion of each carton blank parallel to the paper line axis into a hemmed edge, at least said edge portion having opposite sides thereof coated with a thermoplastic coating and said edge portion being divided into inner and outer halves that extend parallel to the paper line axis with the inner half being intermediate the outer half and the remainder of the blank, the improvement of a said hem forming means comprising:

A. skiving means for skiving the outer half of the edge portion,
B. hemming means for stably positioning the outer half of the edge portion in a predetermined plane that intersects the plane of that blank and that exposes the thermoplastic coating on the outer half of the edge portion,
C. heating means for activating exclusively the thermoplastic coating at the inner half of the edge portion adjacent the skived portion, and
D. means for sealing the skived outer half of the edge portion fully onto the inner half whereby substantially all of the skived outer half seals to the thermoplastic coating on the inner half of the edge portion.

2. A paper box folding machine as recited in claim 1 wherein said skiving means includes bell skiving means for removing at least 50% of the blank material in the outer half of the edge portion and scoring means for forming a score line in the blank parallel to the paper line axis and at the boundary of the outer and inner halves of the edge portion.

3. A paper box folding machine as recited in claim 1 wherein said hemming means includes first folding means for folding the outer half of the edge portion onto the inner half thereof, means for compressing the folded outer half of the edge portion against the inner half and second folding means for returning the outer half of the edge portion to the intersecting plane.

4. A paper box folding machine as recited in claim 1 wherein said hemming means includes first folding means for folding the outer half of the edge portion onto the inner half thereof, means for compressing the folded outer half of the edge portion against the inner half and second folding means for returning the outer half of the edge portion to the intersecting plane at substantially 90° to the plane of the blank.

5. A paper box folding machine as recited in claim 1 wherein said heating means comprises air supply means for providing superheated air and air directing means for directing a series of heated air streams toward the inner half of the edge portion, each said air stream being formed as a planar stream elongated to be parallel to, and said heated air streams being spaced along a line parallel to, the paper line axis thereby to activate the thermoplastic coating in the inner half of the edge portion.

6. A paper box folding machine as recited in claim 1 wherein said sealing means includes means for folding the outer half of the edge portion onto the inner half thereof, means for tacking the outer half to the inner half and means for effecting a seal between the outer and inner halves of edge portion.

7. In a paper box folding machine for forming individually and successively planar carton blanks into folded cartons, said machine including conveyor means for transporting successive, spaced blanks along a paper line axis in a horizontal plane and means for forming a coplanar edge portion of each carton blank parallel to the paper line axis into a hemmed edge, at least said edge portion having upper and lower sides thereof coated with a thermoplastic coating and said edge portion being divided into inner and outer halves that extend parallel to the paper line axis with the inner half being intermediate the outer half and the remainder of the blank, the improvement of apparatus for acting seriatim to form a hemmed edge on each blank, said hemmed edge forming apparatus comprising:

A. skiving means for removing at least 50% of the blank from the lower side of the outer half of the edge portion, B. scoring means for forming a score line in the blank parallel to the paper line axis and at the boundary of the outer and inner halves of the edge portion,
C. first folding means for folding the outer half about the score line onto the lower side of the inner half,
D. means for compressing the folded outer and inner halves,
E. second folding means for returning the outer half of the edge portion to lie in a substantially vertical predetermined plane,
F. air supply means for providing superheated air,
G. air directing means located below the plane of the paper line axis for directing a series of air streams toward the lower side of inner half of the edge portion, each said air stream being formed as a planar stream elongated to be parallel to, and said air streams being spaced along a line parallel to, the paper line axis thereby to limit activation of thermoplastic coating to that present on the lower side of the inner half of the edge portion,
H. third folding means for folding the outer half of the edge portion onto the lower side of the inner half,
I. means for tacking the outer half to the inner half, and
J. sealing means for pressing the outer and inner halves of edge portion thereby to effect a seal therebetween whereby substantially all of the skived outer half seals to the thermoplastic coating on the inner half of the edge portion.

8. Hemmed edge forming apparatus for use in a paper box folding machine as recited in claim 7 wherein said skiving means includes presser foot means located to engage and support the upper side of the outer half of the edge portion and cutter means located below the paper line axis for removing portions of the outer half of the edge portion.

9. Hemmed edge forming apparatus for use in a paper box folding machine as recited in claim 7 wherein said scoring means includes first and second rollers on opposite sides of the blank for rotation about axes transverse to the paper line axis, said rollers having a complementary circumferentially extending groove and bead for deforming the blank material at the boundary of the outer and inner halves of the edge portion thereby to produce a score line.

10. Hemmed edge forming apparatus for use in a paper box folding machine as recited in claim 7 wherein first folding means comprises shoe means extending parallel to the paper line axis and having an edge thereof for engaging the upper side of the outer half of the edge portion, said edge defining a helical line about the edge portion from the upper side to the lower side whereby said shoe means folds the outer half 180° into contact with the lower side of the inner half of the edge portion.

11. Hemmed edge forming apparatus for use in a paper box folding machine as recited in claim 10 wherein said compressing means includes first and second presser rollers on opposite sides of the blank for rotation about axes transverse to the paper line axis, at least one of said presser rollers being biased for positioning vertically toward the other of said presser rollers whereby said first and second presser rollers compress the outer and inner halves of the edge portion together.

12. Hemmed edge forming apparatus for use in a paper box folding machine as recited in claim 10 wherein said second folding means comprises spaced finger means supported generally along the paper lie axis for engaging the upper and lower sides of the edge portion ad aligned to fold the lower portion of the outer half of the edge portion away form the lower portion of the inner half of the edge portion.

13. Hemmed edge forming apparatus for use in a paper box folding machine as recited in claim 7 wherein said air directing means includes means for receiving heated air form said air supply means and chamber means disposed below the paper line axis for directing the air toward the lower side of the inner half of the edge portion, said chamber means including a plurality of aligned, spaced, elongated air passages along an axis parallel to the paper line axis thereby to produce a series of laminar-like heated air flows.

14. Hemmed edge forming apparatus for use in a paper box folding machine as recited n claim 7 wherein third folding means includes belt means and spaced finger means supported generally along the paper line axis for folding the outer half of the edge portion about the score line whereby the skived surface of the outer half contacts the activated thermoplastic coating on the lower portion of the inner half of the edge portion.

15. Hemmed edge forming apparatus for use in a paper box folding machine as recited in claim 14 wherein said tacking means includes roller means oppositely disposed from said belt means, said roller means being rotatable about an axis transverse to the paper line axis, said belt means and said roller means processing the folded outer and inner halves of the edge portion therebetween.

16. Hemmed edge forming apparatus for use in a paper box folding machine as recited in claim 15 wherein said sealing means includes first and second presser rollers on opposite sides of the blank for rotation about axes transverse to the paper lie axis, at least one of said presser rollers being biased for positioning vertically toward the other of said presser rollers whereby said first and second presser rollers compress the outer and inner halves of the edge portion thereby to seal the skived surface of the outer half of the edge portion to the activated coating on the inner half.

17. In a method for forming individually and successively planar carton blanks into folded cartons as they are transported in successive, spaced fashion along a paper line axis wherein each carton has a coplanar edge portion with opposite sides to be formed into a hemmed edge and has, on at least opposite sides at said edge portion, a thermoplastic coating and said edge portion being divided into inner and outer halves that extend parallel to the paper line axis with the inner half being intermediate the outer half and the remainder of the blank, the improvement steps for forming the hemmed edge comprising:
A. skiving the outer half of the edge portion,
B. stably positioning the outer half of the edge portion of a blank in a predetermined plane that intersects the plane of that blank and that exposes the inner half of the edge portion,
C. activating exclusively the thermoplastic coating at the inner half of the edge portion adjacent the skived portion, and
D. sealing the skived outer half of the edge portion onto the inner half thereby to seal substantially all of the skived outer half to the thermoplastic coating on the inner half of the edge portion.

18. A method as recited in claim 17 wherein said skiving removes at least 50% of the blank in the outer half of the edge portion and additionally includes forming a score line in the blank parallel to the paper line axis at the boundary of the outer and inner halves of the edge portion.

19. A method as recited in claim 17 wherein said folding includes a first folding of the outer half of the edge portion onto the inner half thereof, compressing the folded outer half of the edge portion against the inner half and a second folding for returning the outer half of the edge portion to the intersecting plane.

20. A method as recited in claim 17 wherein said folding means includes a first folding of the outer half of the edge portion onto the inner half thereof, compressing the folded outer half of the edge portion against the inner half and a second folding for returning the outer half of the edge portion to the intersecting plane at substantially 90° to the plane of the blank.

21. A method as recited in claim 17 wherein said heating comprises providing a series of discrete, spaced, laminar-like heated air streams directed toward the inner half of the edge portion, each heated air stream being located along a line parallel to the paper line axis thereby to activate only the thermoplastic coating in the inner half of the edge portion.

22. A method as recited in claim 17 wherein said sealing includes folding the first half of the edge portion onto the inner half thereof, tacking the outer half to the inner half and effecting a seal between the outer and inner halves of edge portion.

23. A method forming a hemmed edge along one edge of a paper box planar carton blanks as they are formed individually and successively into folded cartons during transport along a paper line axis in a horizontal plane, at least each edge portion of each blank having upper and lower sides thereof coated with a thermoplastic coating and said edge portion being divided into inner and outer halves that extend parallel to the paper line axis with the inner half being intermediate the outer half and the remainder of the blank, said method comprising the steps of:

A. skiving at least 50% of the blank from the lower side of the outer half of the edge portion, B. scoring a line in the blank parallel to the paper line axis and at the boundary of the outer and inner halves edge portion, C. folding the outer half of the edge portion about the score line onto the lower side of the inner half thereby to form a hem, D. compressing the folded outer and inner halves of the edge portion, E. opening the hem to return the outer half of the edge portion to lie in a substantially vertical, predetermined plane, F. directing a series of superheated air streams toward the lower side of inner half of the edge portion, the air streams being formed as individual laminar-like air streams elongated and spaced along a line parallel to the paper line axis thereby to limit activation of thermoplastic coating to that present on the lower side of the inner half of the edge portion, G. producing a third folding of the outer half of the edge portion half onto the lower side of the inner half, H. tacking the outer half to the inner half, and I. pressing the outer and inner halves of edge portion thereby to effect a seal therebetween whereby substantially all of the skived outer half seals to the thermoplastic coating on the inner half of the edge portion.

24. A method for forming a hemmed edge on a paper box carton as recited in claim 23 wherein said skiving includes engaging and supporting the upper side of the outer half of the edge portion and cutting below the paper line axis for removing portions of the outer half of the edge portion.

25. A method for forming a hemmed edge on a paper box carton as recited in claim 23 wherein said air directing means includes means for receiving heated air from said air supply means and chamber means disposed below the paper line axis for directing the air toward the lower side of the inner half of the edge portion, said chamber means including a aligned, space, elongated air passages along an axis parallel to the paper line axis thereby to produce a series of laminar-like heated air flows.

* * * * *